United States Patent [19]
Christiansen, Jr.

[11] 3,839,131
[45] Oct. 1, 1974

[54] DECORATIVE TREE SYSTEM

[75] Inventor: William Christiansen, Jr., Palmetto, Fla.

[73] Assignee: Snow Foam Products, Inc., El Monte, Calif.

[22] Filed: Oct. 3, 1972

[21] Appl. No.: 294,717

[52] U.S. Cl.................. 161/22, 156/61, D29/1 A
[51] Int. Cl............................................ A47g 33/06
[58] Field of Search .................. 161/22, 23, 24, 17; 240/10 T; D29/1 A; 156/61

[56] References Cited
UNITED STATES PATENTS

| | | | |
|---|---|---|---|
| 2,586,791 | 2/1952 | Dattilo | 161/23 |
| 2,644,883 | 7/1953 | Schoenherr | 240/10 T |
| 2,849,601 | 8/1958 | Walzer | 161/22 |
| 3,219,512 | 11/1965 | Kovacevic | 161/22 |

OTHER PUBLICATIONS
Display World, Nov., 1960, pp. 52.

*Primary Examiner*—William E. Schulz
*Attorney, Agent, or Firm*—Charles E. Wills

[57] ABSTRACT

A decorative simulated tree construction is disclosed embodied from a block of solid material. The block, which may comprise a parallelepiped, is severed by a plurality of tapered annular cuts to define a plurality of concentric hollow truncated cones of progressively diminishing size with the internal diameter at the base of each cone being somewhat greater than the external diameter at the truncated end of the next adjacent cone so that the cones may be separated and stacked to define a serrated tree configuration. A full cone at the center of the block may be provided to top the decorative configuration and the external portion of the block may serve as a base. As disclosed, the construction method for providing the tree structure involves the use of rigid foam plastic.

10 Claims, 5 Drawing Figures

PATENTED OCT 1 1974  3,839,131

DECORATIVE TREE SYSTEM

BACKGROUND AND SUMMARY OF THE INVENTION

In recent years there has been a tendency away from the use of real trees as holiday decorations. In part, the tendency may have resulted from ecological considerations coupled with the relatively high costs involved in providing actual trees to the mass markets of large population centers. Real trees also tend to deteriorate rapidly, present a fire threat and are somewhat of a disposal problem after use. Perhaps as a consequence of all these considerations, a growing need has developed for tree facsimiles primarily for use as items of holiday decor.

One class of facsimile trees includes units that resemble an actual tree in size, structure and appearance. Although various forms of such trees have experienced widespread acceptance, they are generally quite expensive, involve complex assembly procedures and are sometimes inconvenient to store between intervals of use. Another class of tree facsimiles includes units that are simply reminiscent of an actual tree. The construction of the present invention (involving a production method and a product) relates to the latter class of decorative trees. Within the purview of the above considerations, the present invention affords a decorative tree structure having substantial advantages over prior known units. Specifically, the system of the present invention enables the economical manufacture of a tree facsimile using relatively-simple production facilities. The resulting product is in an exceedingly compact form and assembly is simple and easy. Furthermore, the assembled product is attractive and may be easily decorated.

Generally, the present invention relates to providing a block of solid material, e.g., foamed plastic, and cutting therein a plurality of concentrically-positioned, open truncated cones of critical wall thickness and angular taper so that the cones can be removed from the block and stacked in overlapping relationship to provide a serrated facsimile tree configuration. Material utilization is virtually total, and the stack reduces to a completely dense unit for storage and transportation.

BRIEF DESCRIPTION OF THE DRAWING

In the drawing, which constitutes a part of this specification, an exemplary embodiment demonstrating various objectives and features hereof is set forth, as follows.

DETAILED DESCRIPTION OF THE ILLUSTRATIVE EMBODIMENT

As required, a detailed illustrative embodiment of the invention is disclosed herein. The embodiment merely exemplifies the invention which may, of course, be constructed in accordance with various other forms, some of which may be somewhat different from the disclosed illustrative embodiment. However, specific structural and functional details disclosed herein are merely representative and in that regard, provide a basis for the claims herein which define the scope of the invention.

Figure 1:
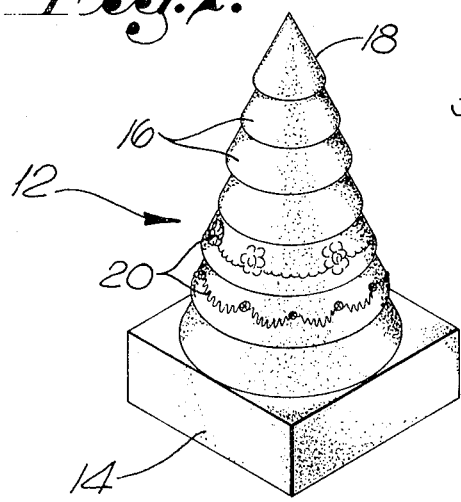
FIG. 1 is a perspective view of a structure incorporating the system of the present invention.

Referring initially to FIG. 1, a unit 12 is depicted constructed in accordance with the present invention. The base of the unit 12 is a base 14 of parallelepiped configuration and as disclosed below, from which all of the other portions of the unit 12 are provided. Supported upon the base 14 are a plurality of hollow, open, truncated cones 16, at the top of which is a full, right circular cone 18. Generally, the cones 16 are stacked in lapped relationship to provide a serrated symmetrical figure of rotation. The cones 16 are simply held together by gravity. In that regard, rigid foam plastic has been discovered to be an effective material for use in the unit 12 in that it is light, inexpensive and components therefrom tend to remain joined together by surface engagement. Also, such material permits the effective use of decorations 20 which may be easily affixed to the unit 12.

Figure 2:
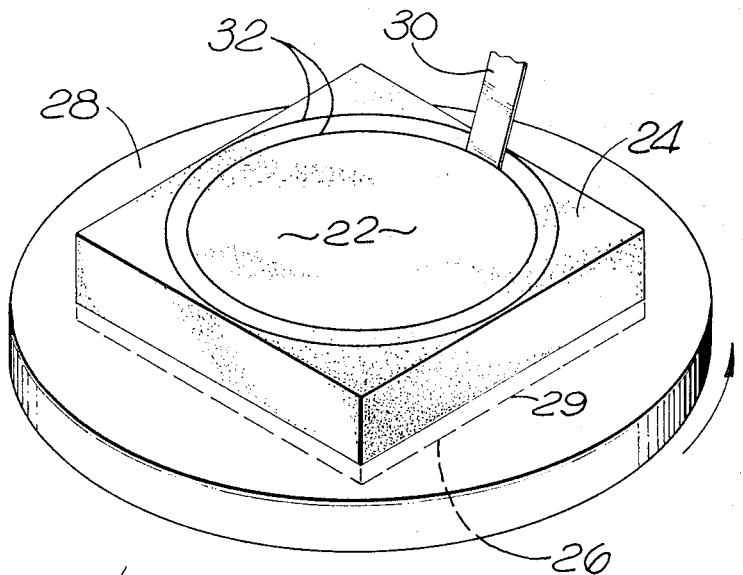
FIG. 2 is a perspective view illustrating one step in the production of the unit of FIG. 1.

Turning now to the method of producing the unit 12, reference will be made initially to FIG. 2. Preliminarily, a solid block or blank 22 of material, e.g., rigid plastic foam, is provided in a parallelepiped configuration in which the thickness dimension (between the surfaces 24 and 26) is somewhat less than the other two dimensions, which incidentally may be similar to define a square. The blank 22 is supported for rotation in an inverted position on a holder 28 which may comprise any of a variety of rotation tables. In one form, the holder 28 may contain a square open recess 29 to matingly receive the blank 22.

Upon rotation of the blank 22 on the support holder 28 as by a drive motor (not shown) a cutter 30 is inserted to enter the blank 22 through the surface 24 at an angle $\theta$ (explained below) of offset from the axis of rotation. The cutter is moved as illustrated in FIG. 2 to substantially penetrate the bottom surface 26. In that manner, a plurality of annular, concentric cuts 32 are provided into the blank 22 to accomplish the individual components of the unit 12 (FIG. 1). The spacing and angular relationship of the cuts 32 in the blank 22 are critical to the accomplishment of the unit 12. That is, the cuts 32 must be performed to accomplish a set of open, truncated cones 16 (FIG. 1) which can be stacked to provide the unit 12 simulating a tree. Generally, cutting operations should also produce termination pieces, e.g., the full cone 18.

Figure 3:
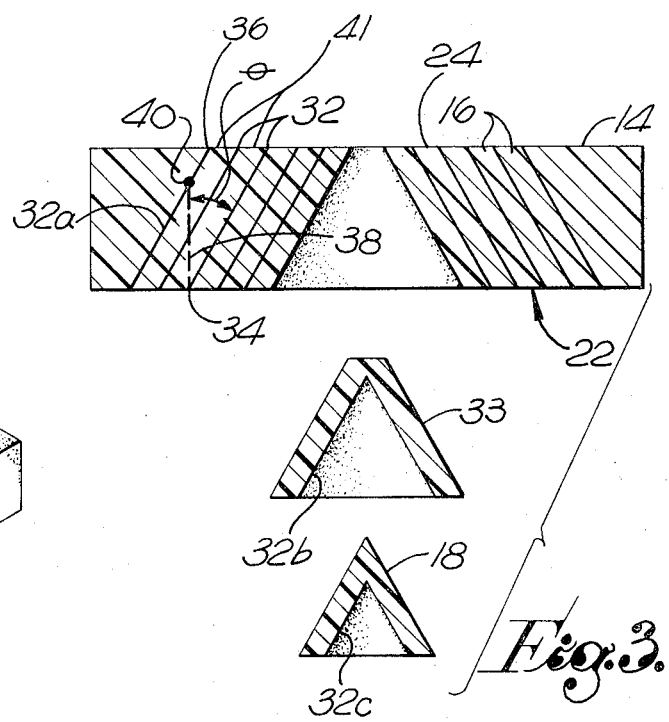
FIG. 3 is a sectional view illustrating another step in the production of the unit of FIG. 1.
Figure 4:
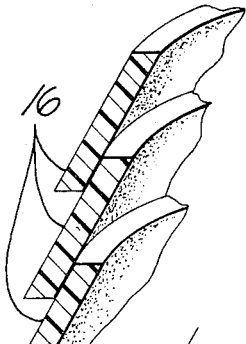
FIG. 4 is a fragmentary sectional view taken vertically through the unit of FIG. 1.

FIG. 3 is a partly exploded and vertical sectional view taken through a blank 22 with all of the cuts 32 completed to define: the open cones 16, the top termination cones 33 and 18, as well as the base 14. From that figure, it may be seen that the thickness of the walls (generally uniform) defining the cones 16 as well as the angle-of-taper $\theta$ (offset from vertical of the cuts) are critical to attain cones 16 which may be stacked as illustrated in FIG. 1. Specifically, the truncated cones 16 are each of progressively diminishing size and furthermore the internal diameter at the base of each cone must be somewhat greater than the external diameter at the upper or truncated end of the next adjacent smaller cone to permit the lapped stacking as illustrated in FIG. 4.

In the illustrative embodiment, the cones 16, 33 and 18 all have substantially uniform wall thickness. Of course, modifications will be apparent; however, in employing right circular cone configurations, the cones 16 appear in cross section as nested, regular trapezoids. Pursuing that analysis, it may be seen that the wall thicknesses of the cones 16 and the angle $\theta$ of the cuts 32 must be selected so that the internal base rim of each cone 16, e.g., rim 34, lies external of the external upper rim of the next larger cone, e.g., rim 36. Specifically, a vertical extension from the rim 34 as indicated by a dashed line 38 must intersect the tapered external surface of the next larger cone 16 at a location 40 that is well down from the top of that cone. Generally, it has been discovered that the diameter at the external tapered surface of the cone 16 that coincides to the diameter at the base of the next smaller cone should occur at a point (location 40) that is downward from the top edge 41 of the cone 16, between one-fifth and one-half the tapered height of the cone. That is, the location 40 coinciding to the degree of overlap, should be between one-fifth and one-half the height of the cut 32a, from the surface 24. The considerations in attaining the critical relationship as indicated above are the wall thickness of the cones 16 (uniform in the illustrative embodiment) and the angle of taper $\theta$. In the event that the location 40 occurs too high on the surface defined by the cut 32a, insufficient interlock is accomplished between the cones 16 when stacked. Alternatively, if the location 40 falls too low, the assembled unit 12 (FIG. 1) does not attain sufficient height.

At the center of the block 22, a pair of cones 18 and 33 are cut which are not open. Specifically, as represented, the cone 33 is truncated; however, the hollow portion does not extend completely through the cone. In a somewhat distinct form, the cone 18 is neither truncated nor open. The cones 18 and 33 serve effectively to accomplish full utilization of the block and additionally provide an effective termination at the upper end of the unit 12 (FIG. 1). The distinction of cones 18 and 33 lies in the fact that the two internal cuts 32b and 32c (which form them) do not pass completely through the block 14 but rather only to vertex points.

Figure 5:
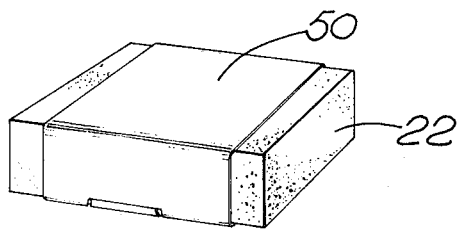
FIG. 5 is a perspective view of a packaged product in accordance with the present invention.

Generally, upon completing the cuts 32 into the blank 22, it may be packaged for storage and/or transportation. In accordance herewith, an effective package has been discovered in the form of a sleeve 50 (FIG. 5) which encircles the blank 22 retaining it together as an integral unit. Prior to removal of the sleeve 50 it may be desirable to separate the individual components by simply flexing the blank 22. Assembly of the unit 12 (FIG. 1) from the package as illustrated in FIG. 5 is simple and easy. Specifically, the external base 14 (FIG. 3) is lifted from the block 22 and placed on a flat support assembly surface. Next, the outermost of the cones 16 is similarly lifted and fitted atop the base 14. Each of the cones 16 (of progressively smaller size) is then lifted from the remainder of the nested structure and fitted atop the assembly structure in partially telescoped relationship (FIG. 4). Finally, the terminating cones 33 and 18 are placed on the assembly, completing the unit 12. As suggested above, the unit 12 then may receive decorations 20, as in the form of ribbons, beads or the like, to complete the structure.

From the above, it may be seen that a process and product are provided having several distinct advantages as a decorative tree facsimile. As indicated, within the critical considerations explained above, the present invention may be variously practiced. Consequently, the scope hereof is deemed to be indicated by the claims as set forth below.

What is claimed is:

1. A process for producing a decorative tree of stacked serrated configuration including the steps of:
    providing a three-dimensional block of rigid material having one dimension smaller than the other two dimensions;
    cutting said block through said one dimension to provide a plurality of open-ended concentric hollow, truncated cones of progressively diminishing size with the internal diameter at the base of each truncated cone somewhat greater than the external diameter at the truncated end of the next adjacent smaller truncated cone;
    separating said truncated cones and stacking said truncated cones together to provide the major lower portion of said decorative tree.

2. A process according to claim 1 wherein said cutting step is performed to provide the truncated cones of a thickness and angle of taper such that in stacked configuration, the overlap extends from between approximately one-fifth to one-half the height of said truncated cones.

3. A process according to claim 1 wherein said material comprises rigid plastic foam.

4. A process according to claim 1 wherein the walls of said truncated cones are of uniform thickness.

5. A process according to claim 1 wherein said block is provided in a parallelepiped shape and said truncated cones are cut with similar wall thickness.

6. A process according to claim 1 wherein an internal closed cone is cut in addition to the open-ended truncated cones, said closed cone being used to form the upper end of said tree.

7. A structure for assembly to provide a decorative tree, comprising:
    a plurality of open-ended concentric hollow truncated cones of progressively diminishing size with the internal diameter at the base of each cone being somewhat greater than the external diameter at the truncated end of the next adjacent cone, said truncated cones being nested together to define opposed flat surfaces;
    a base member defining an internal truncated conical chamber receiving said plurality of truncated cones in nested relationship; and
    a tip member defining a closed cone, received concentrically within said truncated cones.

8. A structure according to claim 7 wherein said truncated cones, said base member and said tip member comprise rigid plastic foam.

9. A structure according to claim 7 wherein said base member defines a parallelepiped external configuration.

10. A structure according to claim 7 further including a sleeve containing said nested cones and members.

* * * * *